United States Patent [19]

Emura et al.

[11] Patent Number: 5,200,895
[45] Date of Patent: Apr. 6, 1993

[54] AUTOMOTIVE SUSPENSION SYSTEM WITH ENHANCED RESPONSE CHARACTERISTICS

[75] Inventors: Junichi Emura; Fumiyuki Yamaoka; Shinobu Kakizaki; Mitsuo Sasaki; Hiroyuki Shimizu, all of Kanagawa, Japan

[73] Assignee: Atsugi Unisia Corporation, Japan

[21] Appl. No.: 626,062

[22] Filed: Dec. 12, 1990

[30] Foreign Application Priority Data

| Dec. 13, 1989 | [JP] | Japan | 1-324826 |
| Dec. 16, 1989 | [JP] | Japan | 1-326525 |
| Dec. 16, 1989 | [JP] | Japan | 1-326526 |

[51] Int. Cl.⁵ ............................................ B60G 17/015
[52] U.S. Cl. ........................... 364/424.05; 280/707
[58] Field of Search ............ 364/424.05, 424.01; 280/707, 708

[56] References Cited

U.S. PATENT DOCUMENTS

| 4,949,262 | 8/1990 | Buma et al. | 364/424.05 |
| 4,973,083 | 11/1990 | Ikemoto et al. | 280/707 |
| 5,042,834 | 8/1991 | Yonekawa et al. | 280/707 |
| 5,043,893 | 8/1991 | Aburaya et al. | 364/424.05 |

*Primary Examiner*—Thomas G. Black
*Attorney, Agent, or Firm*—Ronald P. Kananen

[57] ABSTRACT

A suspension control system for an automotive vehicle comprises a multi-stage variable damping force shock absorber which is variable of damping characteristics at a plurality of mutually different damping modes. The control system also comprises means for monitoring a vehicular driving parameter representing a suspension control parameter, a plurality of data maps set in a memory unit respectively containing a damping characteristics selection pattern for deriving damping characteristics, toward which the damping characteristics of the shock absorber is to be controlled, on the basis of the suspension control parameter. Means, responsive to the current damping characteristics of the shock absorber, are provided for selecting one of the data map, and means for performing suspension control with selected one of data map for deriving a suspension control signal by looking-up the selected one of data map in terms of the suspension control parameter for controlling damping characteristics of the shock absorber.

12 Claims, 9 Drawing Sheets

FIG. 3(a) DM5N

| ⑤ | | | | | | | |
|---|---|---|---|---|---|---|---|
| | 5 | 6 | 7 | 8 | 8 | 8 | 8 |
| | 4 | 5 | 6 | 7 | 8 | 8 | 8 |
| | 3 | 4 | 5 | 6 | 7 | 8 | 8 |
| | 2 | 3 | 4 | 5 | 6 | 7 | 8 |
| | 1 | 2 | 3 | 4 | 5 | 6 | 7 |
| | 1 | 1 | 2 | 3 | 4 | 5 | 6 |
| | 1 | 1 | 1 | 2 | 3 | 4 | 5 |

FIG. 3(b) DM5H

| 5H | | | | | | | |
|---|---|---|---|---|---|---|---|
| | 5H | 6H | 7H | 8H | 8H | 8H | 8H |
| | 4H | 5H | 6H | 7H | 8H | 8H | 8H |
| | 3H | 4H | 5H | 6H | 7H | 8H | 8H |
| | 2H | 3H | 4H | 5H | 6H | 7H | 8H |
| | 1H | 2H | 3H | 4H | 5H | 6H | 7H |
| | 1H | 1H | 2H | 3H | 4H | 5H | 6H |
| | 1H | 1H | 1H | 2H | 3H | 4H | 5H |

FIG. 3(c) DM4H

| 4H | | | | | | | |
|---|---|---|---|---|---|---|---|
| | 4H | 5H | 6H | 7H | 8H | 8H | 8H |
| | 3H | 4H | 5H | 6H | 7H | 8H | 8H |
| | 2H | 3H | 4H | 5H | 6H | 7H | 8H |
| | 1H | 2H | 3H | 4H | 5H | 6H | 7H |
| | 1H | 1H | 2H | 3H | 4H | 5H | 6H |
| | 1H | 1H | 1H | 2H | 3H | 4H | 5H |
| | 1H | 1H | 1H | 1H | 2H | 3H | 4H |

AUTOMOTIVE SUSPENSION SYSTEM WITH ENHANCED RESPONSE CHARACTERISTICS

BACKGROUND OF THE INVENTION

1. Field of the Invention

The present invention relates generally to a control system for an automotive suspension system for adjusting suspension characteristics depending upon vehicle driving condition. More specifically, the invention relates to a suspension control system which requires lessor arithmetic processing of suspension control parameters and thus can enhance response characteristics.

2. Description of the Background Art

Japanese Patent First (unexamined) Publication (Tokkai) Showa 62-181908 discloses one example of a suspension control system. The suspension control system includes an acceleration sensor for monitoring vertical acceleration to be generated in response to bounding and rebounding strokes of vertical vibration. A variable damping force shock absorber is provided in a suspension system and is associated with the suspension control system for adjusting damping characteristics. The control system monitors vehicular driving condition for deriving optimal damping characteristics depending thereon.

In such conventional prior art, a vertical acceleration dependent control parameter is derived on the basis of the monitored vertical acceleration by means of the vertical acceleration sensor. The acceleration dependent control parameter is compared with a predetermined threshold value for controlling the damping characteristics of the variable damping force shock absorber based on the result of comparison. In order to perform the arithmetic operation, the control system is required to have a capability for differentiation and integration of the data to be processed. Therefore, the microprocessor forming the core of the control system becomes complicated and requires a high cost. Furthermore, a larger system necessarily requires greater processing time for lowering of the response characteristics.

SUMMARY OF THE INVENTION

In view of the foregoing drawbacks in the prior art, it is an object of the present invention to provide a suspension control system which can reduce production cost with enhanced response characteristics.

Another object of the invention is to provide a suspension control system which is capable of correction of tolerance in damping characteristics.

According to one aspect of the invention, a suspension control system for an automotive vehicle comprises:

a multi-stage variable damping force shock absorber which is variable of damping characteristics at a plurality of mutually different damping modes;

means for monitoring a vehicular driving parameter representing a suspension control parameter;

a plurality of data maps set in a memory unit respectively containing a damping characteristics selection pattern for deriving damping characteristics, toward which the damping characteristic of the shock absorber is to be controlled, on the basis of the suspension control parameter;

means, responsive to the current damping characteristics of the shock absorber, for selecting one of the data maps; and means for performing suspension control with the selected one of the data maps for deriving a suspension control signal by looking-up the selected one of the data maps in terms of the suspension control parameter for controlling damping characteristics of the shock absorber.

The data map selection means may switch the selected one of the data maps upon an occurrence of a variation of the damping characteristics of the shock absorber. The suspension control system further comprises means, responsive to a temperature condition of a working fluid in the shock absorber for switching a data map selection depending upon the working fluid temperture. In the alternative, the suspension control system further comprise means for switching a data map section depending upon frequency of occurrence of damping characteristics variation.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIGS. 3(a) to 3(c) illustrate content in the data maps, in which FIG. 3(a) shows a basic data map for a fifth stage, FIG. 3(b) shows a correction data map for the fifth stage, and FIG. 3(c) shows a correction data map for a fourth stage;

FIG. 6 is a flowchart showing a modified process which also implements the preferred suspension control;

DESCRIPTION OF THE PREFERRED EMBODIMENT

Figure 1:
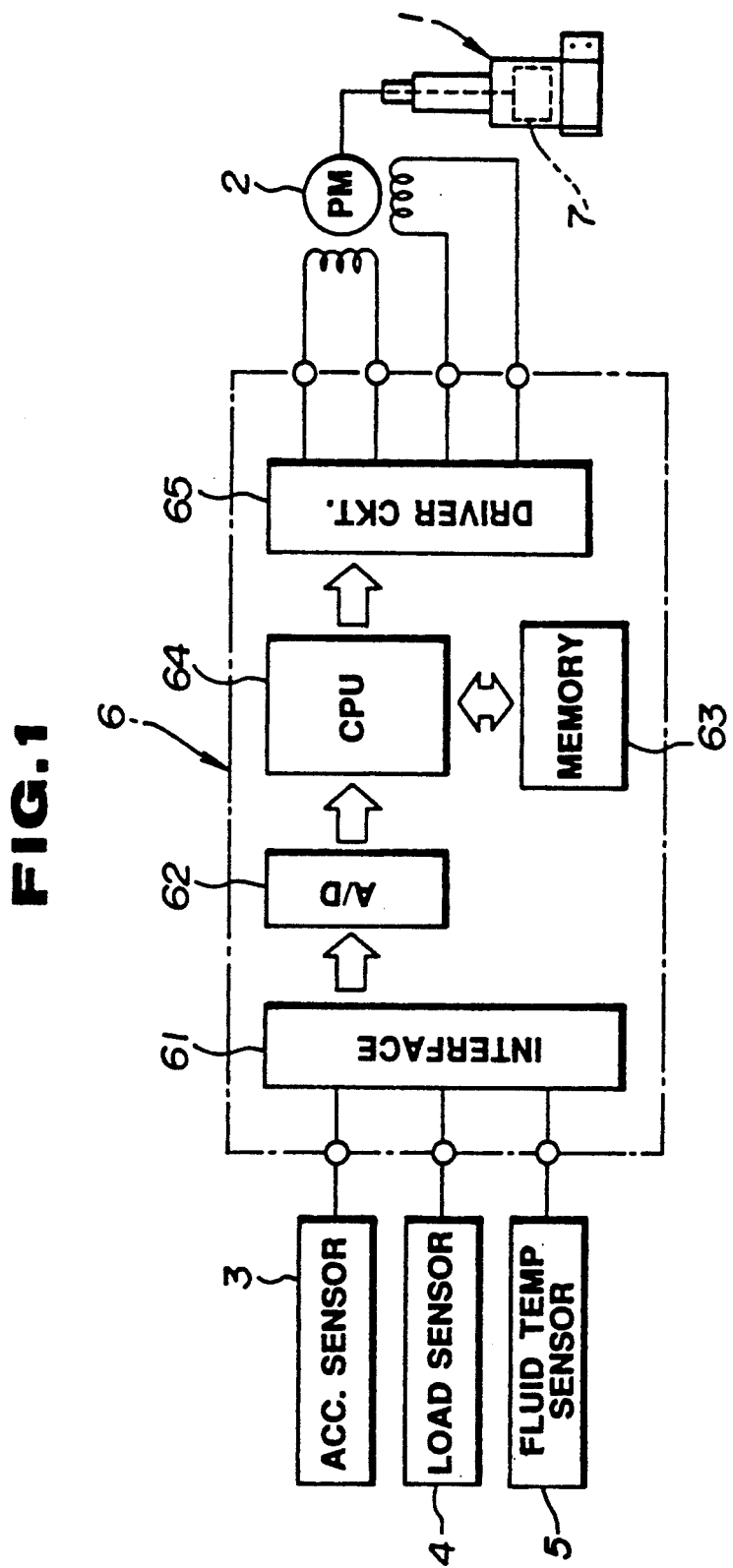
FIG. 1 is a schematic block diagram of the preferred embodiment of a suspension control system according to the present invention.
Figure 2:
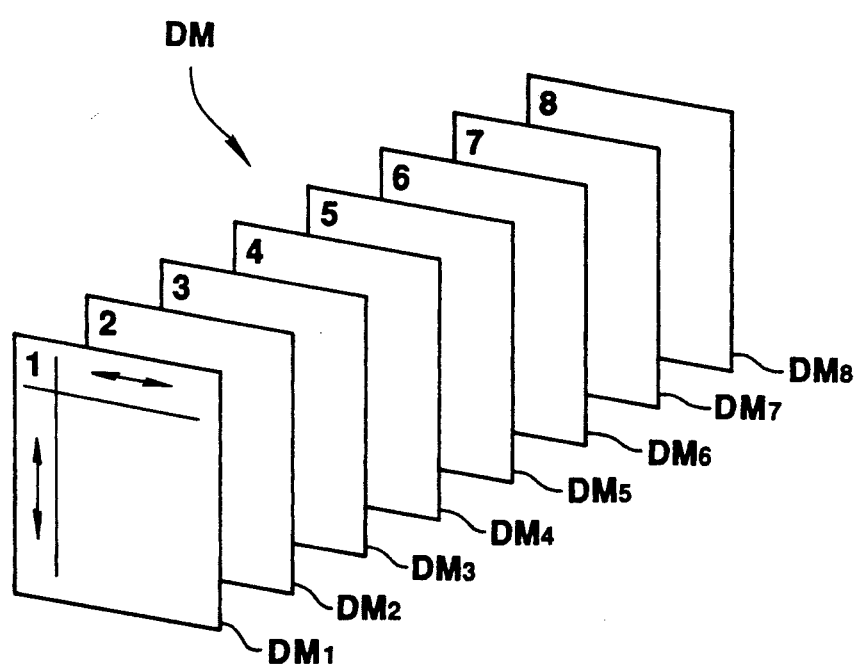
FIG. 2 is an explanatory illustration imaginarily showing a suspension control data map employed in the preferred embodiment of the suspension control system of FIG. 1.

Referring now to the drawings, particularly to FIG. 1, the preferred embodiment of the suspension control system, according to the present invention, is applied for an automotive suspension system which employs an 8-way variable damping force shock absorber 1. The shock absorber 1 has a damping force adjusting element 7, such as a rotary valve for 8-way variation of the damping characteristics. The damping force adjusting element 7 of the variable damping force shock absorber 1 is associated with a pulse motor 2 which drives the damping force adjusting element to a desired position for obtaining desired damping characteristics. The pulse motor 2 is connected to a control unit 6. The control unit 6 generally comprises a microprocessor including a CPU 64, an input interface 61, an analog-to-digital (A/D) converter 62, a memory unit 63 and a driver circuit 65. The interface 61 is connected to a vertical acceleration sensor 3, a load sensor 4, and a fluid temperature sensor 5.

The vertical acceleration sensor 3 is mounted on a vehicular body as a sprung mass of the suspension system for monitoring vertical acceleration exerted thereon to produce a vertical acceleration indicative signal $v_\alpha$ which is variable across zero depending upon a direction of the vertical displacement of the vehicular body and depending upon a magnitude of the vibration. On the other hand, the load sensor 4 is provided for monitoring relative speed between the vehicular body as the sprung mass and a suspension assembly as an unsprung mass. For this purpose, in the shown embodiment, the load sensor 4 is provided at an orientation between the vehicular body and the shock absorber 1 for monitoring input load from the shock absorber to the vehicular body to produce a load indicative signal $v_F$.

The vertical acceleration indicative signal $v_\alpha$ and the load indicative signal $v_F$ are received through the input interface 61 and converted into digital vertical acceleration data $\alpha$ and the digital load data F by an A/D converter 62. The control unit 6 processes the digital data for deriving a damping characteristics control signal for driving the pulse motor 2 via the driver circuit 65 for positioning the damping force adjusting element 7 to the position corresponding to the desired damping characteristics.

In the shown embodiment, a plurality of data maps $DM_1 \sim DM_8$ are set in the memory unit 64 so that one of the maps is selected based on the vertical acceleration data $\alpha$ and the load data F. In practice, since the shown embodiment performs an 8-way adjustment of the damping characteristics, eight data maps are set in the memory unit 64. FIGS. 3(a) to 3(c) show examples of the data maps employed in the shown embodiment of the suspension control system. In the shown example, FIGS. 3(a) and 3(b) show data maps to use as used while the current damping set forth is the fifth stage of the damping characteristics, in which FIG. 3(a) shows a map for a normal fifth stage operational mode, and FIG. 3(b) shows a map for a harder side correction of the fifth stage damping characteristics control. On the other hand, FIG. 3(c) shows a softer side correction of the fifth stage damping characteristics control which corresponds to the harder side correction of the fourth stage damping characteristics control. In each of the data maps, the damping characteristics stage indicated at the upper left corner represents the current damping characteristics stage. Therefore, one of the data maps having the damping characteristics indication coincidence with the current damping characteristics is selected for performing damping characteristics control. Utilizing one of the damping characteristics data map selected in view of the current mode of operation of the variable damping force shock absorber, control of the operational mode of the shock absorber is performed in terms of the vertical acceleration data $\alpha$ and the load data F.

Figure 4:
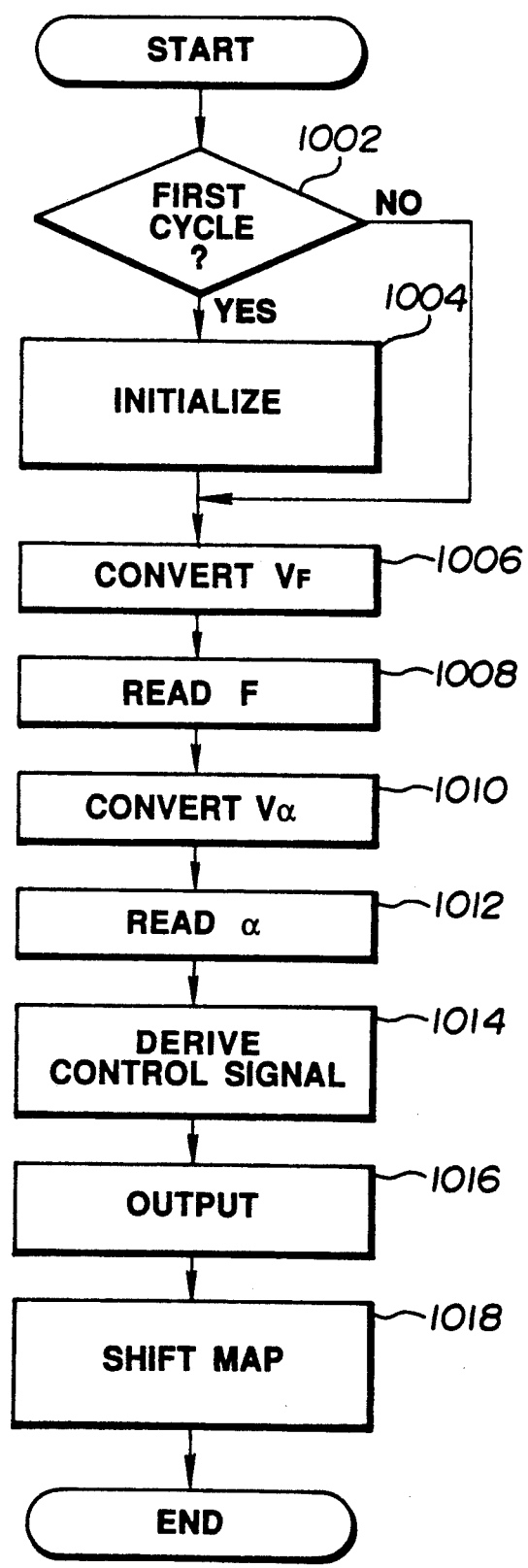
FIGS. 4 and 6 illustrate flowcharts of suspension control routines for implementing the preferred process of suspension control in the preferred embodiment of the suspension control system according to the invention.

The preferred process of suspension control will be discussed herebelow with reference to FIG. 4. The routine illustrated in FIG. 4 is periodically triggered at a predetermined timing, e.g. every 20 msec. Immediately after starting execution, a check is performed whether the current execution cycle is the first cycle after an ON-set of power supply at a step 1002. In practice, the check may be performed by checking a flag which is set during each cycle of execution of the routine. If the current execution cycle as checked at the step 1002 is the first cycle, initialization is performed at a step 1004. In the initialization process, the polarity of the vertical acceleration data $\alpha$ and the load data F are both set positive. Also, at the initial stage, the first stage data map $DM_1$, which is adapted for the first and most soft stage of operational mode of the variable damping force shock absorber, is selected. Then, the data maps $DM_1$ to $DM_8$ are loaded in an order that the first stage data map $DM_1$ is set at the first address. In practice, the data maps $DM_1$ to $DM_8$ are stored in a ROM in the memory unit 63 in the predetermined order to RAM. In case that the result of checking at the step 1002 is negative, then the process jumps the initialization step 1004.

Subsequently, the load indicative signal $v_F$ from the load sensor 4 is read out at a step 1006 and A/D converted by the A/D converter 62 for deriving the load data F at a step 1008. Also, at a step 1010, the vertical acceleration indicative signal $v_\alpha$ from the vertical acceleration sensor 3 is read out at a step 1012 and is A/D converted by the A/D converter 62 to derive the vertical acceleration data $\alpha$. Then, map looking-up against the data map DM stored at the first address in RAM is performed in terms of the load data F and the vertical acceleration data $\alpha$ for deriving the operational mode of the variable damping shock absorber 1 adapted to the vehicle driving condition as defined by the vertical acceleration and the load, at a step 1014. Then, based on the result of map look-up, a suspension control signal ordering the corresponding operational mode of the shock absorber 1 is output at a step 1016. Thereafter, the data map DM is shifted in RAM so that the data map corresponding to the selected operational mode of the shock absorber 1 is stored in the first memory address, at a step 1018.

Figure 5:
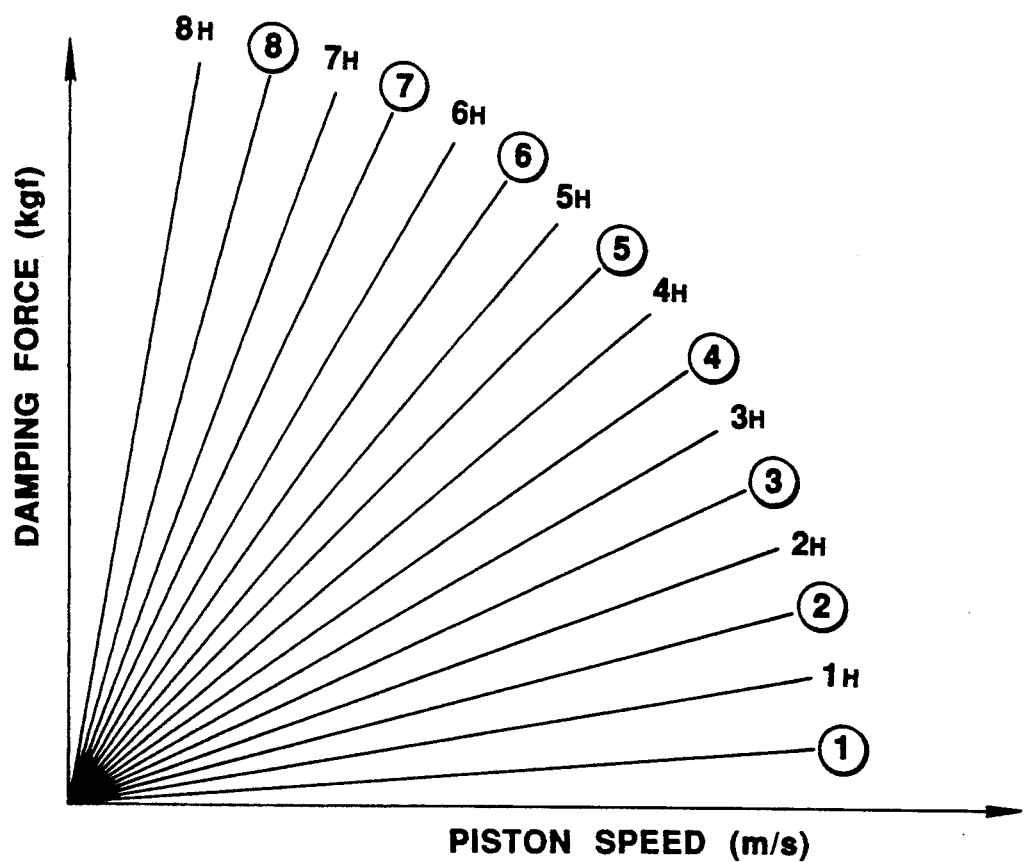
FIG. 5 shows a chart showing damping characteristics of a variable damping force shock absorber employed in the suspension control system of FIG. 1.

The suspension control signal thus derived is applied to the pulse motor 2 for driving the damping force adjusting element 7 to the operational position corresponding to the operational mode of the shock absorber 1 to establish the selected mode of damping characteristics. As shown in FIG. 5, the damping characteristics of the shock absorber are depicted relative to the vibration stroke which substantially correspond to a stroke of a piston in the shock absorber.

In order to establish a multi-stage, e.g. 8-way, adjustment of the damping characteristics of the shock absorber, the variable damping force shock as disclosed in the co-pending U.S. Pat. application Ser. No. 7/536,771 filed on Jun. 12, 1990, which has been commonly assigned to the assignee of the present invention, now U.S. Pat. No. 5,133,434, issued on Jul. 28, 1992. The disclosure of the above-identified U.S. patent is herein incorporated by reference for the sake of disclosure.

Figure 6:
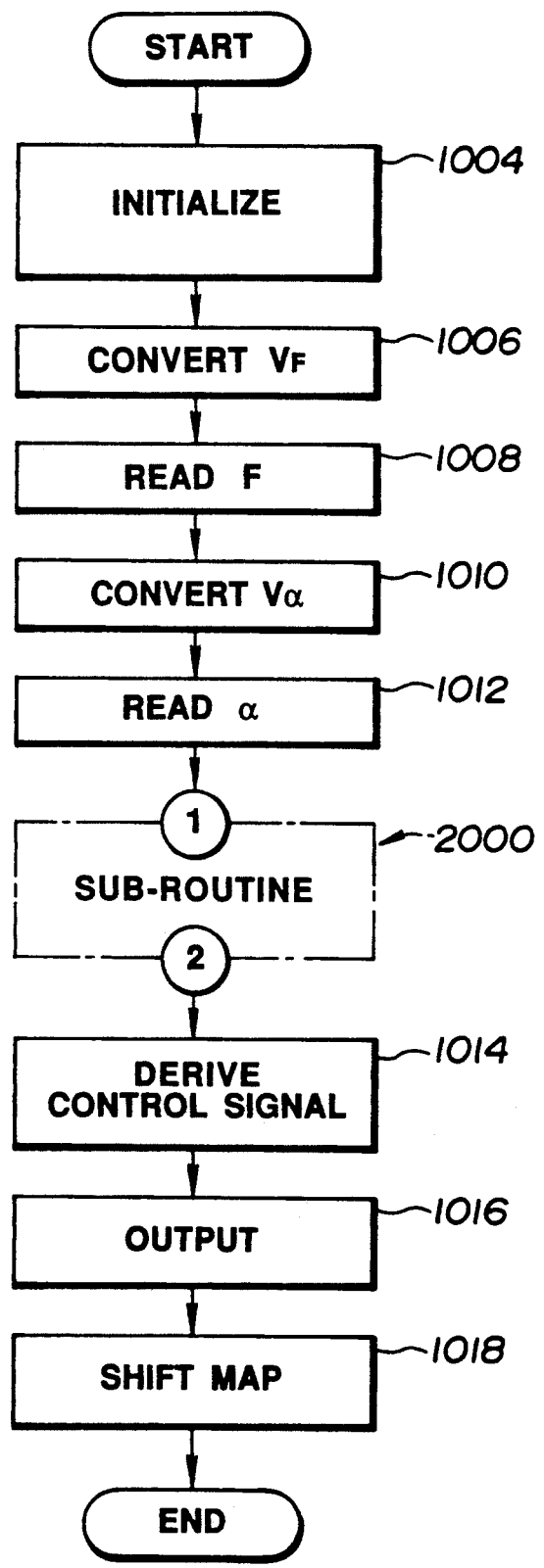
Figure 7:
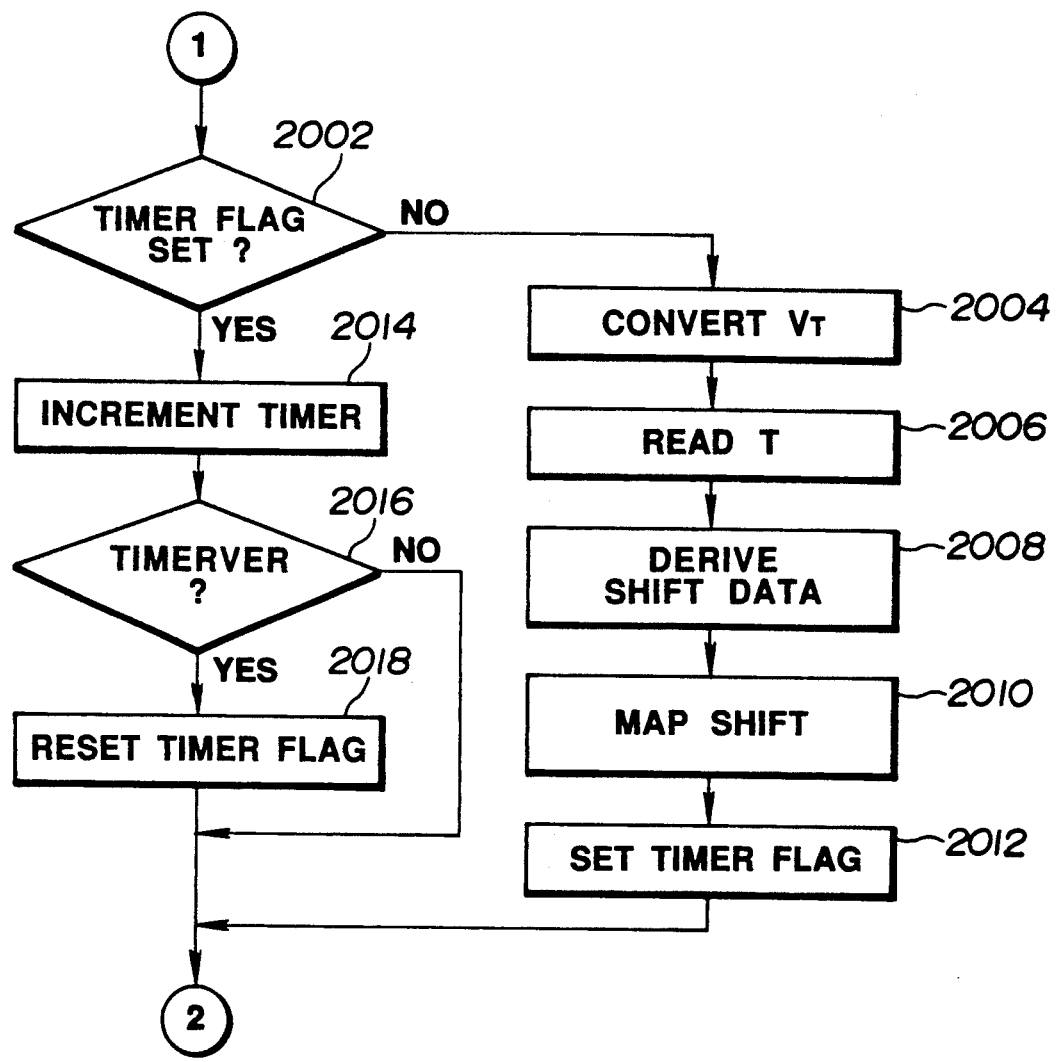
FIG. 7 is a flowchart showing a subroutine for fluid temperature dependent correction.

FIGS. 6 and 7 show a modified process to be executed in the preferred embodiment of the suspension control system, according to the invention. In this modification, the routine illustrated in FIG. 6 is similar to that illustrated in FIG. 4. Therefore, in order to avoid a redundant disclosure for clarity of disclosure, common steps to the former process may be represented by the same step numbers.

As can be seen from FIG. 6, a sub-routine 2000 illustrated in FIG. 7 is executed between the steps 1012 and 1014. The shown sub-routine performs shifting of the data maps $DM_1$ to $DM_8$ in RAM depending upon working fluid temperature which may affect viscosity of the working fluid and thus affect damping characteristics. In practice, the shown sub-routine causes shifting of the data map in the first address of RAM depending upon the fluid temperature. Namely, the fluid temperature dependent data map shift data is derived to increment or decrement by approximately 30° C. to 40° C. of fluid temperature variation. When the shift data is $+1$, harder damping characteristics in the selected operational mode are selected as indicated by $1_H$ to $8_H$ in which harder damping characteristics to the selected stage of damping characteristics but softer than the next stage of damping characteristics. Similarly, softer damping characteristics are selected which corresponds to the harder damping characteristics in one lower stage of the damping characteristics. In the shown sub-routine, a timer flag is checked at a step 2002. If the timer flag as checked at the step 2002 is not set, a working fluid temperature indicative signal $v_T$ from a fluid temperature sensor 5 is A/D converted by the A/D converter 62 at a step 2004. Then, the converted working fluid temperature data T is read out, at a step 2006. Then, shift data is derived based on the fluid temperature data T, at a step 2010. In practice, the shift data may be derived by map look-up against a shift data map which is set in terms the fluid temperature data T. The shift data map may be set to vary the shift data at every 30° C. to 40° C. of fluid temperature variation.

At a step 2012, the timer flag is set. Thereafter the process returns to the main routine of FIG. 6.

On the other hand, if the timer flag as checked at the step 2002 is set, then, the timer value is incremented at a step 2014. Then, the timer value is compared with a predetermined timer threshold to check "TIME OVER", at a step 2016. In practice, the fluid temperature dependent shift of the data map DM does not require high response because variation of the fluid temperature is relatively slow. Therefore, in the shown embodiment, the timer threshold is set about 40 min to 1 hour. When the timer value is greater than or equal to the timer threshold as checked at the step 2016 and thus "TIME OVER" is detected, the timer flag is reset at a step 2018.

As can be appreciated, through the shown process, the data map selection with taking the fluid temperature condition can be performed for compensating influence of variation of viscosity of the working fluid in the shock absorber.

Figure 8:
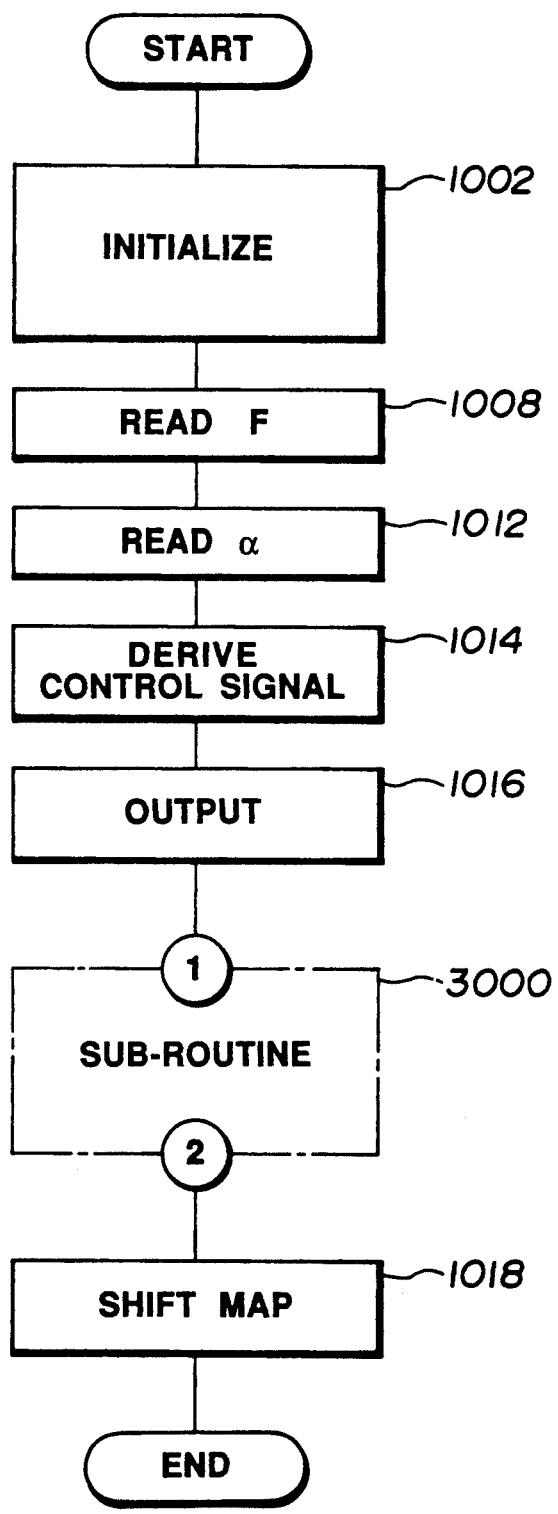
FIG. 8 is a flowchart showing another modification of the suspension control routine.
Figure 9:
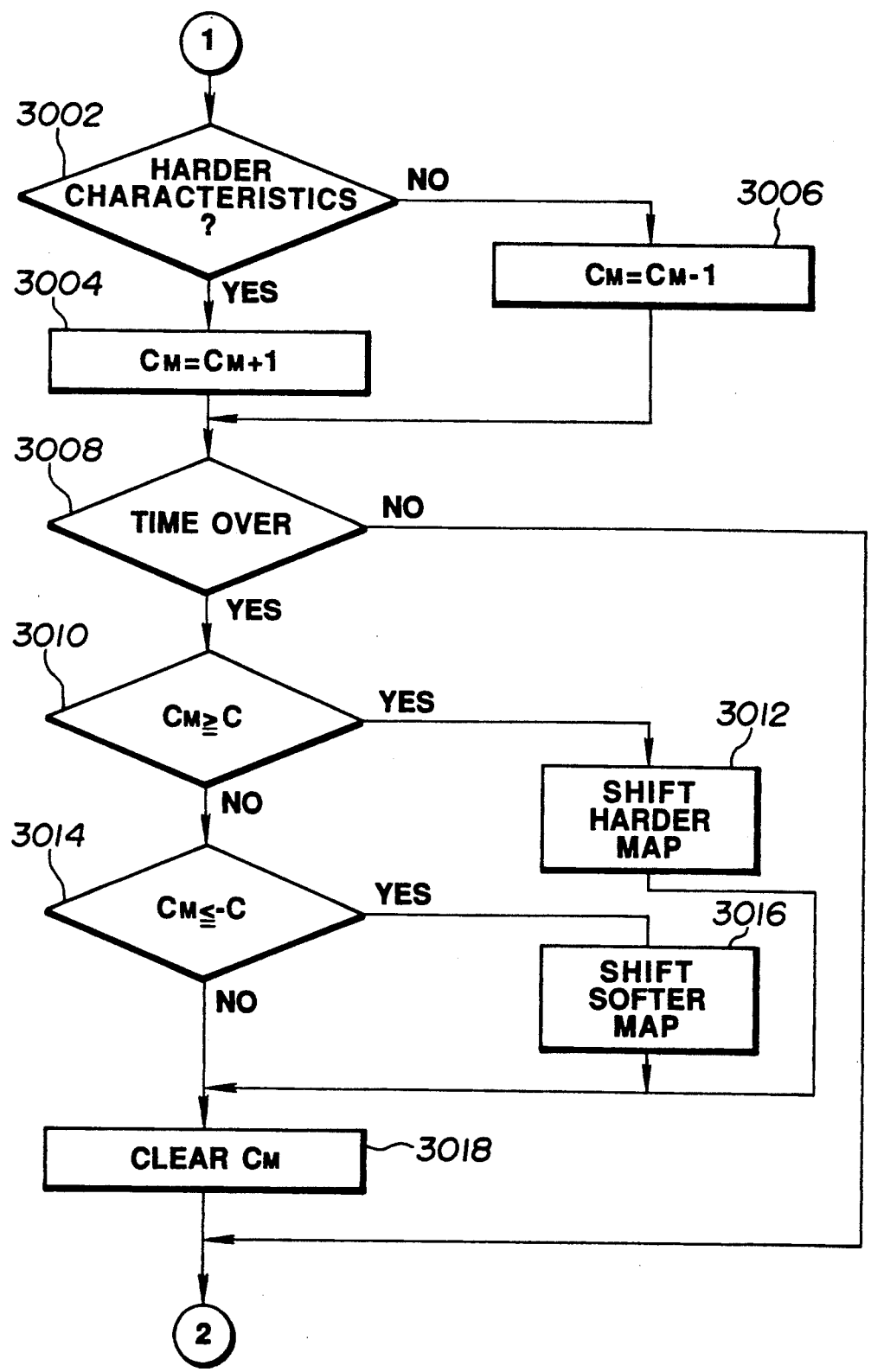
FIG. 9 is a flowchart showing a subroutine for tolerance compensation.

FIGS. 8 and 9 show another modification of the suspension control routine to be executed by the shown embodiment of the suspension control system according to the invention. Similarly to the foregoing modification, the main routine in the shown modification is similar to the routine of FIG. 4. Therefore, the common process steps in the shown routine will be represented by the same reference numerals to the foregoing embodiments.

In the shown process, a sub-routine of frequency dependent adjustment of damping characteristics is inserted between the steps 1010 and 1012. In the sub-routine of FIG. 9, a check is performed for the frequency of occurrence of control for harder damping characteristics and softer damping characteristics at a step 3002. If the frequency of occurrence of control for harder damping characteristics is higher than that for the softer damping characteristics, a map shift counter value $C_M$ is incremented by 1 at a step 3004. On the other hand; when the frequency of occurrence of control for softer damping characteristics is higher than that for the harder damping characteristics, the map shift counter value $C_M$ is decremented by 1 at a step 3006.

At a step 3008, TIME OVER is checked. Namely, a timer is reset every predetermined timing so that the map shift counter value $C_M$ representing occurrence of control for harder and softer damping characteristics is latched at every predetermined period. If TIME OVER is not detected as checked at the step 3008, the process returns to the main routine of FIG. 8. On the other hand, if TIME OVER is detected at the step 3008, the map shift counter value $C_M$ is compared with a harder mode criterion C at a step 3010. When the map shift counter value $C_M$ is greater than or equal to the harder mode criterion C, the harder damping characteristics of the same operational stage is selected for shifting to the data map corresponding to the selected harder damping characteristics to the first address in RAM at a step 3012. On the other hand, when the map shift counter value $C_M$ is smaller than or equal to a softer mode criterion as checked at a step 3014, then softer damping characteristics in the same operational stage are selected at a step 3016. Thereafter the map shift counter value $C_M$ is reset at a step 3018.

In this modification, since the selection of data map DM is shifted depending upon a tendency of control direction, fluctuation of damping characteristics due to tolerance in manufacture can be successfully compensated.

While the present invention has been discussed hereinabove in terms of the preferred embodiment of the invention, the invention should be appreciated to be restricted for the shown embodiment. The invention can be embodied in various fashion. Therefore, the invention should be interpreted to include all possible embodiments and modifications which can be embodied without departing from the principle of the invention set out in the appended claims.

For example, in the shown embodiments are directed for the process, in which all of the data maps set in ROM are loaded for RAM in the given order, it may be possible to selectively load one or several data maps depending upon the current operational mode of the shock absorber.

What is claimed is:

1. A system for controlling damping characteristics for a vehicle comprising:
    a multi-stage variable damping force shock absorber which is variable of damping characteristics in a plurality of damping modes different from each other;
    sensor means for monitoring a vehicular driving parameter representing a damping force control parameter;
    a plurality of data maps stored in a memory unit which are assigned to the damping modes respectively, each data map representing preselected different relations of the damping mode relative to a value of the damping force control parameter; and
    control means responsive to the damping force control parameter monitored by said sensor means for selecting one of the damping modes based on a value of the damping force control parameter according to a preselected one of the data maps stored in a first memory location of the memory unit for modifying the damping characteristics of said multi-stage variable damping shock absorber, said control means arranging the data map in the first memory location which is assigned to the damping mode selected every damping mode selecting operation of said control means.

2. A system as set forth in claim 1, wherein said data maps are stored in the memory unit in a preselected sequence, said control means arranging the sequence of data maps every damping mode selecting operation so that the data map assigned to the selected damping mode is initially retrieved from the memory unit in a subsequent damping mode selecting operation.

3. A system as set forth in claim 2, wherein said multi-stage variable damping force shock absorber is variable of the damping characteristics in at least first, second, and third damping modes, said memory unit storing first, second, and third data maps in first, second, and third memory locations which correspond to the first, second, and third damping modes respectively, said control means selecting one of the damping modes based on the value of the damping force control parameter monitored by said sensor means according to the first data map stored in the first memory location, said control means then changing the data map stored in the first memory location to another data map which corresponds to the selected damping mode.

4. A system as set forth in claim 1, wherein said sensor means includes a first sensor monitoring vertical acceleration acting on a vehicle body and a second sensor monitoring relative speed between a sprung mass and an unsprung mass, the data map representing the preselected relations of the damping mode relative to values of the vertical acceleration and the relative speed.

5. A system for controlling damping characteristics for a vehicle comprising:
a multi-stage variable damping force fluid shock absorber which is variable of damping characteristics in a plurality of damping modes different from each other;
first sensor means for monitoring a vehicular driving parameter representing a damping force control parameter to provide a signal indicative thereof;
second sensor means for monitoring temperature of a working fluid in said multi-stage variable damping force shock absorber to provide a signal indicative of a fluid temperature;
a plurality of data maps stored in a memory unit which correspond to the damping modes respectively, said data maps indicating preselected relations of the damping mode relative to a value of the damping force control parameter; and
control means responsive to the signal from said first sensor means for selecting one of the damping modes based on a value of the damping force control parameter monitored by said first sensor means according to a preselected one of the data maps for modifying the damping characteristics of said multi-stage variable damping force shock absorber, said control means being responsive to variation in the fluid temperature monitored by said second sensor means to change contents of the data maps for compensating variation in the damping characteristics caused by the variation in fluid temperature.

6. A system as set forth in claim 5, wherein said control means is responsive to the signal from said first sensor means for selecting one of the damping modes based on the value of the damping force control parameter monitored by said first sensor means according to the preselected data map stored in a first memory location of the memory unit, said control means changing the data map stored in the first memory location to another data map which provides harder damping characteristics when the fluid temperature monitored by said second sensor means is greater than a preselected value.

7. A system as set forth in claim 6, wherein the memory unit stores a first group of data maps providing predetermined different damping characteristics respectively and a second group of data maps providing predetermined different damping characteristics respectively which are harder than the damping characteristics provided by the data maps of the first group by a preselected degree, said control means being responsive to the signal from said first sensor means for selecting one of the damping modes based on the value of the damping force control parameter monitored by said first sensor means according to one of the data maps of the first group when the fluid temperature is less than a preselected value, said control means selecting one of the damping modes according to one of the data maps of the second group when the fluid temperature is greater than the preselected value.

8. A system as set forth in claim 5, wherein said control means is responsive to the signal from said first sensor means for selecting one of the damping modes based on the value of the damping force control parameter monitored by said first sensor means according to the preselected data map stored in a first memory location of the memory unit, said control means changing the data map to another data map which provides softer damping characteristics when the fluid temperature monitored by said second sensor means is less than a preselected value.

9. A system as set forth in claim 5, wherein said first sensor means includes a first sensor monitoring vertical acceleration acting on a vehicle body and a second sensor monitoring relative speed between a sprung mass and an unsprung mass, the data maps representing the preselected relations of the damping mode relative to values of the vertical acceleration and the relative speed respectively.

10. A system for controlling damping characteristics for a vehicle comprising:
a multi-stage variable damping force shock absorber which is variable of damping characteristics in a plurality of damping modes different from each other;
sensor means for monitoring a vehicular driving parameter representing a damping force control parameter to provide a signal indicative thereof;
a plurality of data maps stored in a memory unit which are assigned to the damping modes respectively, said data maps representing preselected relations of the damping mode relative to a value of the damping force control parameter; and
control means responsive to the signal from said sensor means for selecting one of the damping modes based on a value of the damping force control parameter monitored by said sensor means according to a preselected one of the data maps for modifying the damping characteristics of said multi-stage variable damping shock absorber in harder or softer damping characteristic directions, said control means including counter means for counting the number of damping mode selecting operations in the harder and softer damping characteristic directions, said control means changing the data map to another data map which provides harder damping characteristics when the number of the damping mode selecting operation in the harder damping characteristic direction is greater than in the softer damping characteristic direction by a preselected value, said control means changing the data map to another data map which provides softer damping characteristics when the number of the damping mode selecting operation in the harder damping characteristic direction is less than in the softer damping characteristic direction by a preselected value.

11. A system as set forth in claim 10, wherein the memory unit stores a first group of data maps providing predetermined different damping characteristics respectively and a second group of data maps providing predetermined different damping characteristics respectively which are harder than the damping characteristics provided by the data maps of the first group by a preselected degree, said control means changing the data maps of the first group to the second group when the number of the damping mode selecting operation in the harder damping characteristic direction is greater than in the softer damping characteristic direction by a preselected value.

12. A system as set forth in claim 10, wherein said sensor means includes a first sensor monitoring vertical acceleration acting on a vehicle body and a second sensor monitoring relative speed between a sprung mass and an unsprung mass, the data maps representing the preselected relations of the damping mode relative to values of the vertical acceleration and the relative speed respectively.

* * * * *